July 13, 1943. L. MALESON 2,324,222
AMMONIUM SULPHATE RECOVERY PROCESS
Filed March 19, 1941
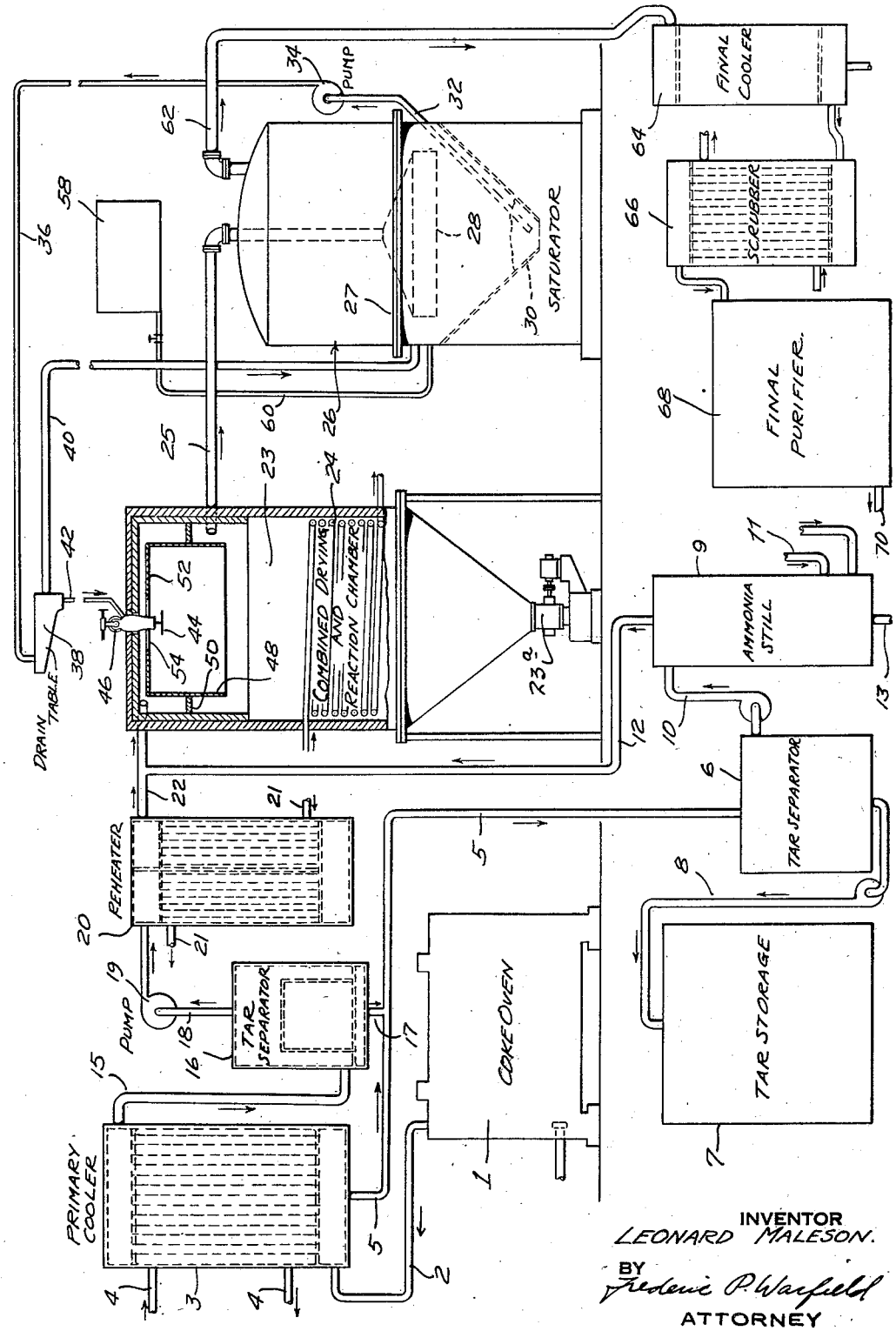
INVENTOR
LEONARD MALESON.
BY Frederic P. Warfield
ATTORNEY Patented July 13, 1943

2,324,222

UNITED STATES PATENT OFFICE 2,324,222

AMMONIUM SULPHATE RECOVERY PROCESS

Leonard Maleson, Philadelphia, Pa.

Application March 19, 1941, Serial No. 384,088

1 Claim. (Cl. 23—119)

This invention relates to the production of ammonium sulphate and particularly to the recovery of ammonium sulphate as a by-product from the distillation products of fuels, such as coal.

In the usual commercial process of separating ammonia from coke oven gases, the gases are passed through a sulphuric acid solution to cause a reaction between the acid and the ammonia in the gas, resulting in precipitation of ammonium sulphate crystals which sink to the bottom of the solution. A sludge of ammonium sulphate crystals and acid solution is then removed, the excess solution drained off, and then the ammonium sulphate crystals are dried in centrifugal driers and subsequently in additional driers to remove as much of the acid solution as possible.

This process of separating and refining ammonium sulphate has several disadvantages. In the first place, the recovered ammonium sulphate crystals have too much acid solution associated with them, because of the difficulty in removing this solution by means of the driers used. The crystals coated with acid solution tend to fuse together upon standing, which makes the product difficult to handle, even if there is no other objection to the presence of acid. In the second place, the centrifugal driers have to be operated intermittently, and the ammonium sulphate cakes in them, making it difficult to clean them. Thirdly, the separation and refinement of the sulphate crystals is expensive due to the number of centrifuges required to permit a continuous process with attendant high initial cost and high continuous operating cost, both in power and maintenance.

It is one of the objects of the invention to provide a recovery process for ammonium sulphate which is much simpler and less expensive than the processes of the prior art.

Another object of the invention is to provide a recovery process for ammonium sulphate by means of which the centrifugal driers and final driers now in general use for this purpose may be eliminated.

Another object of the invention is to provide a continuous process for recovering ammonium sulphate from the destructive distillation of fuels.

A further object of the invention is to provide a process for producing larger crystals of ammonium sulphate than have heretofore been produced.

Another object of the invention is to provide a process for recovering ammonium sulphate from the distillation of fuels which will result in a product freer from acid than the sulphate heretofore recovered by known processes.

Another object of the invention is to provide a process for recovering ammonium sulphate from the distillation of fuels, whereby a saturator of smaller size is required than has heretofore been found necessary and the cost accordingly lessened.

Still another object of the invention is to provide an improved apparatus for recovering ammonium sulphate as a by-product from coke oven operation.

The invention accordingly comprises the several steps and the relation of one or more such steps with respect to each of the others, and the apparatus embodying features of construction, combinations of elements, and arrangement of parts which are adapted to effect such steps, all as exemplified in the following detailed disclosure, and the scope of the application of which will be indicated in the claim.

For a fuller understanding of the nature and objects of the invention reference should be had to the following detailed description taken in connection with the accompanying drawing in which the single figure shows diagrammatically an arrangement of apparatus for carrying on the process of the invention.

Gas coming directly from the coke oven 1 is led through the pipe 2 into a primary cooler 3, the function of which is to reduce the temperature to a point where condensation of tar and water takes place. Although this temperature may vary considerably, depending upon the nature of the gas, it will generally be between 75 and 80° C. which is usually sufficient to reduce the gas temperature slightly below the dew point of the entrained water vapor. This cooler 3 may be any type of heat exchange device suitable for this purpose, cooled, for instance, by circulating water into and out of the cooler through pipes 4, and is provided with a drain pipe 5 through which the condensed tar and water, including fixed ammonia and free ammonia which are dissolved in the condensate, pass to a tar separating tank 6.

From the tar separator 6, the tar is led to a tar storage tank 7 by means of the pipe 8. The remaining liquor is carried into an ammonia still 9 by means of the pipe 10. The ammonia still 9 is heated by any desired heating means, as, for instance, the steam line 11, and in this still the ammonia liquor is treated with steam and alkali, such as calcium hydrate, to convert the fixed ammonia into ammonia gas which leaves the top of the still through the pipe 12 while the undesirable remaining liquor is drained off at the bottom through the pipe 13.

After passing through the primary cooler 3, where part of the tar is removed, the gas is conveyed through a pipe 15 into a tar extractor 16 which may be any one of a number of electrical or mechanical precipitating devices well known in the art for that purpose. Any tar or other condensate which is separated out in the tar extractor 16 is drained out of the bottom of the tar extractor 16 and is delivered through the pipe 17 to the condensate pipe 5 leading to the tar separator 6. The gas leaves the tar extractor 16 through the pipe 18 which includes a gas booster or pump 19 for the purpose of raising the pressure of the gas and at the same time reducing the pressure in the tar extractor 16. The gas booster 18 delivers the gas under pressure to a reheater 20 which may be heated in any desired manner, as by means of the circulating pipes 21. Any source of heat may be used for this reheater, as, for instance, exhaust steam, live steam, or reclaimed heat from the primary cooler 3.

The gas passes from the reheater 20 through a pipe 22 into a combined drying and reaction chamber 23. Before the gas enters the chamber 23, the ammonia gas from the ammonia still 9 is added by connecting the pipe 12 leading from the still 9 to the pipe 22. Thus the gas from the coke oven with the tar and some of the water removed, but containing the ammonia gas, is delivered to the reaction chamber 23. The function of this reaction chamber will be described later.

The gas leaves the reaction chamber 23 through the pipe 25 which delivers it to the saturator 26. This saturator contains sulphuric acid at some desired concentration, as, for instance, 30 or 40%, the sulphuric acid being maintained in the saturator to a level as indicated by the line 27. The pipe 25 passes into the saturator and is provided with an enlarged nozzle 28 which opens below the level of the sulphuric acid solution, so that gas passing into the saturator must bubble up through the acid.

The booster 19 heats the gas by increasing the pressure, and this heat plus the additional heat supplied by the reheater 20 and the heat of the reaction is sufficient to give the gas as it enters the drying chamber 23 a temperature which will cause rapid evaporation of any liquid present which is preferably substantially equal or greater than the boiling point of the acid at the concentration maintained in the saturator.

Thus the boiling point temperature for 30% concentrated sulphuric acid would be 108° C. and for 40% concentration would be about 114° C. While this is the common range of acid concentration for a saturator, this may vary under different operating conditions. In any case, the proper boiling point should be determined, making corrections for the pressure of the gas in drying chamber 23.

As the gas passes through the sulphuric acid solution, the ammonia in the gas reacts with the acid to form ammonium sulphate, which remains in solution, and when the solution passes the saturation point, crystals of ammonium sulphate precipitate out and settle to the bottom of the saturator in the solution. The bottom of the saturator is preferably provided with sloping sides, forming a sump 30 into which the ammonium sulphate crystals will fall and from which they may be removed continuously in the form of a sludge through a pipe 32 which extends down into the saturator with its open end in the sump 30. A pump 34 is connected to this pipe 32 and is driven by any suitable power means, so as to withdraw continuously from the sump in the saturator the sludge containing the saturated ammonium sulphate solution and the ammonium sulphate crystals together with some of the acid, and to deliver this sludge through a pipe 36 to a drain table 38 which may be entirely covered to prevent acid fumes from escaping into the air.

The excess ammonium sulphate solution and acid in the sludge drains from the drain table and is returned by means of a pipe 40 to the saturator, entering the saturator below the acid level. The more solid part of the sludge containing some acid passes by gravity through a pipe 42 into the top of the combined drying and reaction chamber 23 where it is finely comminuted by any suitable means. To accomplish this purpose, I have shown a disc 44 which is rotatably supported in the top of the reaction chamber 23 and is driven by a motor or turbine 46. The sludge containing the sulphate crystals is deposited on the rotating disc 44 at about the center thereof, so that the rotation of the disc throws the sludge material off of the edge by centrifugal force. A cylindrical baffle 48 is provided around the disc 44 and is supported in a plate 50 which closes off the space between the baffle 48 and the inside walls of the reaction chamber. The top of the cylindrical baffle 48 is closed by a cover plate 52 which has an opening 54 in the center thereof through which the distributing mechanism extends. The gas coming from the pipe 22 into the top of the reaction chamber 23 must pass down through the opening 54 and through the cylindrical baffle 48, so that it is brought closely into contact with the flying particles of sludge as they leave the edges of the rotating disc. The drain table 38 is placed high enough above the reaction chamber to provide sufficient head to form a gas seal in the pipe 42.

It is important that the gas in the combined drying and reaction chamber 23 be maintained at a temperature above the vaporizing temperature of the acid solution and thus also above the vaporizing temperature of water at the particular pressure maintained in the chamber. This is in order to make sure that the crystals falling to the bottom of the chamber will be thoroughly dry. Any solution which may enter the chamber in the sludge, unless combined with the incoming ammonia gas, is immediately evaporated and passes in vapor form out of the chamber again through the pipe 25. If found necessary heating coil 24 may be provided in the chamber 23 to insure the proper temperature.

The crystals which fall to the bottom of the chamber 23 may be removed continuously by means of suitable material handling mechanism 23a which at the same time provides a seal to prevent the escape of gases from the chamber.

This recycling of the sulphate sludge has several advantageous effects. In the first place, free acid particles will react with the ammonia in the incoming gas to form small ammonium sulphate crystals, most of which will be carried with the gas out of the reaction chamber through the pipe 25 into the saturator 26 where these particles will form nuclei for other ammonium sulphate crystals to be formed in the saturator. In the second place, the ammonium sulphate crystals leaving the rotating disc 44 are wet with a saturated solution of ammonium sulphate and acid, and upon coming in contact with the ammonia gas in the reaction chamber will grow in size as the ammonia reacts with the wet coating, forming larger crystals which fall to the bottom of the reaction chamber and may be continuously removed in a manner already described. In addition, since the temperature in the reaction chamber is maintained above the boiling point of the acid and therefore above the boiling point of water, any acid which is not reacted with the ammonia gas is vaporized together with any water present and passes out through the pipe 25. The ammonium sulphate in the saturated solution covering the crystals deposits upon the crystals as it dries, adding to the size.

The crystals which fall to the bottom of the reaction chamber are thoroughly dry with appreciably no acid remaining on their surfaces and are larger than those heretofore produced by methods of the prior art. They can then be removed from the bottom of the reaction chamber and handled in any desired manner for shipment.

The fact that fine ammonium sulphate crystals pass with the gas out of the reaction chamber and then are carried with the gas through the acid solution in the saturator insures a much quicker action between the remaining ammonia and the acid in the saturator, because these small crystals form nuclei for the formation of the larger crystals as they precipitate out of the saturated solution. This permits a smaller quantity of acid to be carried in the saturator, because the time element of crystal formation is substantially reduced. Therefore considerable savings in gas pumping costs can be effected. The action is also augmented by the rapid pumping of the sludge liquor to the enclosed drain table and the return of the mother liquor to the saturator, which may be two or three times faster than is accomplished under present practice where the sludge is removed and passes through a more complete drying process to separate out the ammonium sulphate crystals. In addition, this rapid recirculation aids the rapid formation of the crystals, increases the size of the crystals, and reduces salting or clogging of the pipes. For these reasons, and because the saturator does not have to produce all of the ammonium sulphate crystals, the saturator can be smaller and less costly than those used heretofore in connection with ammonium sulphate recovery. Existing saturators can have thereby a greater gas capacity.

It is not at all difficult to pump the sulphate sludge from the saturator to the draining table and deliver it from there to the reaction chamber. No expensive centrifugal driers need be employed to remove the excess solution from the ammonium sulphate crystals. The whole arrangement provides a simpler and cheaper way to produce a better product.

Because the ammonium sulphate crystals are produced in the reaction chamber 23 freer from acid than crystals produced by processes heretofore employed, less of the acid is used up in the saturator. As it becomes necessary to add acid from time to time, this can be done from the acid supply tank 58 through the pipe 60, sulphuric acid of 60 to 66° Beaumé being preferred. It is important that the temperature of the saturator bath be kept high enough that sufficient water vapor is removed with the gas so as to prevent water building up in the saturator.

The gas may be taken from the saturator by means of a pipe 62 and may be passed successively through additional refining apparatus such as a cooler 64, a scrubber 66, and a final purifier 68. The cooler will condense excess water vapor and remove condensate, and further treatment may be used to remove carbolic oils, benzol, toluol, xylol, and other products. The gas leaves the final purifier through the pipe 70 and may then be passed to a storage tank to be held ready for use.

Since certain changes in carrying out the above process and in constructions set forth, which embody the invention may be made without departing from its scope, it is intended that all matter contained in the above description or shown in the accompanying drawing shall be interpreted as illustrative and not in a limiting sense.

It is also to be understood that the following claim is intended to cover all of the generic and specific features of the invention which as a matter of language might be said to fall therebetween.

Having described my invention, what I claim as new and desire to secure by Letters Patent is:

The continuous process for producing ammonium sulphate crystals which comprises passing gas containing ammonia in a continuous stream through a reaction chamber, then passing the gas through a saturator containing sulphuric acid solution, contacting the ammonia with the solution whereby the ammonia combines with the acid to form ammonium sulphate crystals which are precipitated in said solution, continuously removing a sludge of ammonium sulphate crystals and mother liquor from said saturator, draining a major portion of said mother liquor from said crystals, contacting the crystals and remaining mother liquor with the ammonia-containing gas in said reaction chamber in such a manner that the mother liquor is dispersed therein in finely divided form and maintaining such contact in said reaction chamber at a temperature above the vaporizing temperature of the mother liquor contained on said crystals and for a period of time sufficient to neutralize and dry the ammonium sulphate crystals and to form small ammonium sulphate crystals from the mother liquor, which crystals pass with the gas into the saturator, and removing dry, acid-free ammonium sulphate crystals from said reaction chamber.

LEONARD MALESON.